United States Patent
An et al.

(10) Patent No.: US 7,485,384 B2
(45) Date of Patent: Feb. 3, 2009

(54) COOLING APPARATUS FOR FUEL CELL AND FUEL CELL SYSTEM HAVING THE SAME

(75) Inventors: Seong-Jin An, Suwon-si (KR); Ho-Jin Kweon, Suwon-si (KR); Hyoung-Juhn Kim, Suwon-si (KR); Ju-Yong Kim, Suwon-si (KR); Yeong-Chan Eun, Suwon-si (KR); Sung-Yong Cho, Suwon-si (KR); Dong-Hun Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 371 days.

(21) Appl. No.: 11/043,395

(22) Filed: Jan. 25, 2005

(65) Prior Publication Data

US 2005/0164062 A1    Jul. 28, 2005

(30) Foreign Application Priority Data

Jan. 26, 2004   (KR)   ................. 10-2004-004669

(51) Int. Cl.
*H01M 8/04* (2006.01)
*H01M 2/00* (2006.01)

(52) U.S. Cl. .......................................... 429/26; 429/34
(58) Field of Classification Search .................. 429/26, 429/34
See application file for complete search history.

(56) References Cited

U.S. PATENT DOCUMENTS 3,160,528 A * 12/1964 Dengler et al. ............ 429/22
4,276,355 A * 6/1981 Kothmann et al. ........... 429/26
2004/0081874 A1* 4/2004 Tachtler et al. ............... 429/26
2005/0008912 A1* 1/2005 Yang et al. ................... 429/26

FOREIGN PATENT DOCUMENTS

| CN | 1381074 A | 11/2002 |
|---|---|---|
| CN | 15171204 A | 1/2005 |
| EP | 1498971 | * 1/2005 |
| JP | 60-101873 | 6/1985 |

(Continued)

OTHER PUBLICATIONS

Patent Abstracts of Japan for Publication No. 60-254568, Date of publication of application Dec. 16, 1985, in the name of Heishiro Goto.

(Continued)

*Primary Examiner*—Patrick Ryan
*Assistant Examiner*—Thomas H. Parsons
(74) *Attorney, Agent, or Firm*—Christie, Parker & Hale, LLP

(57) ABSTRACT

A cooling apparatus of a fuel cell system includes a housing for providing a space for receiving an electricity generating unit and a cooling medium supply unit connected to the housing to supply the cooling medium to the electricity generating unit. The housing has a body having a space for receiving the electricity generating unit. A guide section is connected to the body to collect the cooling medium passing through electricity generating unit. An exhaust unit is connected to the guide section to exhaust the cooling medium to outside of the housing.

15 Claims, 6 Drawing Sheets

FOREIGN PATENT DOCUMENTS

| | | | |
|---|---|---|---|
| JP | 60-254568 | | 12/1985 |
| JP | 61-157269 | | 9/1986 |
| JP | 61157269 | * | 9/1986 |
| WO | WO 01/73877 A2 | | 10/2001 |

OTHER PUBLICATIONS

Patent Abstracts of Japan, Publication No. 60-101873, dated Jun. 5, 1985, in the name of Mutsuya Saito et al.

English Abstract for Japan Laid Open Publication No. 61-157269, dated Sep. 29, 1986, in the name of Fuji Electric Co., Ltd.

* cited by examiner

COOLING APPARATUS FOR FUEL CELL AND FUEL CELL SYSTEM HAVING THE SAME

CROSS-REFERENCE TO RELATED APPLICATIONS

This application claims priority to and the benefit of Korean Patent Application No. 10-2004-0004669 filed on Jan. 26, 2004 in the Korean Intellectual Property Office, the entire content of which is incorporated herein by reference.

BACKGROUND OF THE INVENTION (a) Field of the Invention

The present invention relates to a fuel cell system, and more particularly, to a cooling apparatus for a fuel cell stack.

(b) Description of the Related Art

As known in the art, a fuel cell is a system for producing electric power through a chemical reaction of oxygen and hydrogen contained in hydrocarbon-group materials such as methanol, ethanol, and natural gas.

Recently, a polymer electrolyte membrane fuel cell (hereinafter, referred to as PEMFC) has been developed in the field of fuel cells. Since the PEMFC has excellent output characteristics, a low operating temperature, and fast starting and response capabilities, it has a wide range of applications such as a mobile power source for vehicles, a distributed power source in the home or buildings, and a small-sized power source in electronic devices. The PEMFC system typically includes a stack, a reformer, a fuel tank, and a fuel pump. The stack forms an electricity generating assembly consisting of a plurality of unit cells, and the fuel pump supplies to the reformer fuel stored in the fuel tank. The reformer reforms the fuel to create hydrogen gas, and supplies the hydrogen gas to the stack.

Accordingly, the PEMFC system supplies to the reformer the fuel stored in the fuel tank by operation of the fuel pump, and the fuel is reformed in the reformer to generate hydrogen gas. Then, the hydrogen gas is supplied to the stack. Air is also supplied to the stack through a separate pump. Subsequently, the hydrogen gas and oxygen in the air are electro-chemically reacted in the stack to generate electric energy.

In the aforementioned stack of the fuel cell system, the reaction between the hydrogen and the oxygen generates a predetermined temperature of heat, which poorly influences the stability and performance of the stack.

Also, in the conventional fuel cell systems, the air supplied to the stack is preheated to maintain an appropriate level of driving temperature in the stack. In this case, energy consumed to preheat the air reduces performance efficiency of the entire system.

SUMMARY OF THE INVENTION

In accordance with the present invention a cooling apparatus for a fuel cell and a fuel cell system having the same is provided, by which cooling efficiency for the stack can be improved. In addition, the present invention provides a fuel cell system which enables reuse of a cooling medium that has been used to cool the stack.

In an aspect of the present invention, there is provided a cooling apparatus for a fuel cell, which cools heat generated in an electricity generating unit by supplying a cooling medium to a space for receiving the electricity generating unit and guides the cooling medium passing through the electricity generating unit to exhaust it to outside of the receiving space.

The cooling apparatus for a fuel cell may include: a housing for receiving an electricity generating unit; and a cooling medium supply unit connected to the housing to supply a cooling medium to the electricity generating unit. The housing may include: a body having a space for receiving the electricity generating unit; a guide section connected to the body to collect the cooling medium passing through the electricity generating unit; and an exhaust unit connected to the guide section to exhaust the cooling medium to outside of the housing.

One or more electricity generating units may be provided in the receiving space, and the cooling medium may flow along a cooling pathway interposed between the electricity generating units.

The cooling medium supply unit may include a fan which sucks air and exhaust the air to the receiving space.

The guide section may be formed in a funnel shape having a decreasing inner diameter toward the exhaust unit.

According to another aspect of the present invention, there is provided a fuel cell system including: an electricity generating unit which generates electricity through reaction between oxygen and hydrogen; a fuel supply source which supplies the hydrogen to the electricity generating unit; a main oxygen supply source which supplies the oxygen to the electricity generating unit during an initial operation of the fuel cell system; a cooling apparatus which supplies the cooling medium to the electricity generating unit to cool the heat generated in the electricity generating unit; and a subsidiary oxygen supply source which collects the cooling medium heated by passing through the electricity generating unit and supplies the cooling medium to the electricity generating unit.

The electricity generating unit may include separators and a membrane-electrode assembly (MEA) interposed therebetween.

One or more electricity generating units may be provided in the fuel cell system to form a stack, which is a combination structure of the electricity generating units.

The stack may have a cooling pathway for passing the cooling medium through the neighboring electricity generating units. The cooling pathway may be formed by combining the channels formed in a space where one side of one of the separators is adjacent to one side of the opposing one of the separators.

The cooling pathway may be formed by combing channels provided on each surface of the adjacent sides of the separators.

The cooling pathway may be formed in a cooling plate disposed between the electricity generating units.

The fuel supply source may include: a fuel tank for reserving the fuel; and a pump connected to the fuel tank to supply the fuel.

The subsidiary oxygen supply source may include a pump connected to the exhaust unit of the housing to suck the cooling medium exhausted from the exhaust unit and supply the cooling medium to the electricity generating unit, and the pump may include an inlet for sucking the cooling medium and an outlet for outputting the cooling medium.

DETAILED DESCRIPTION

Figure 1:
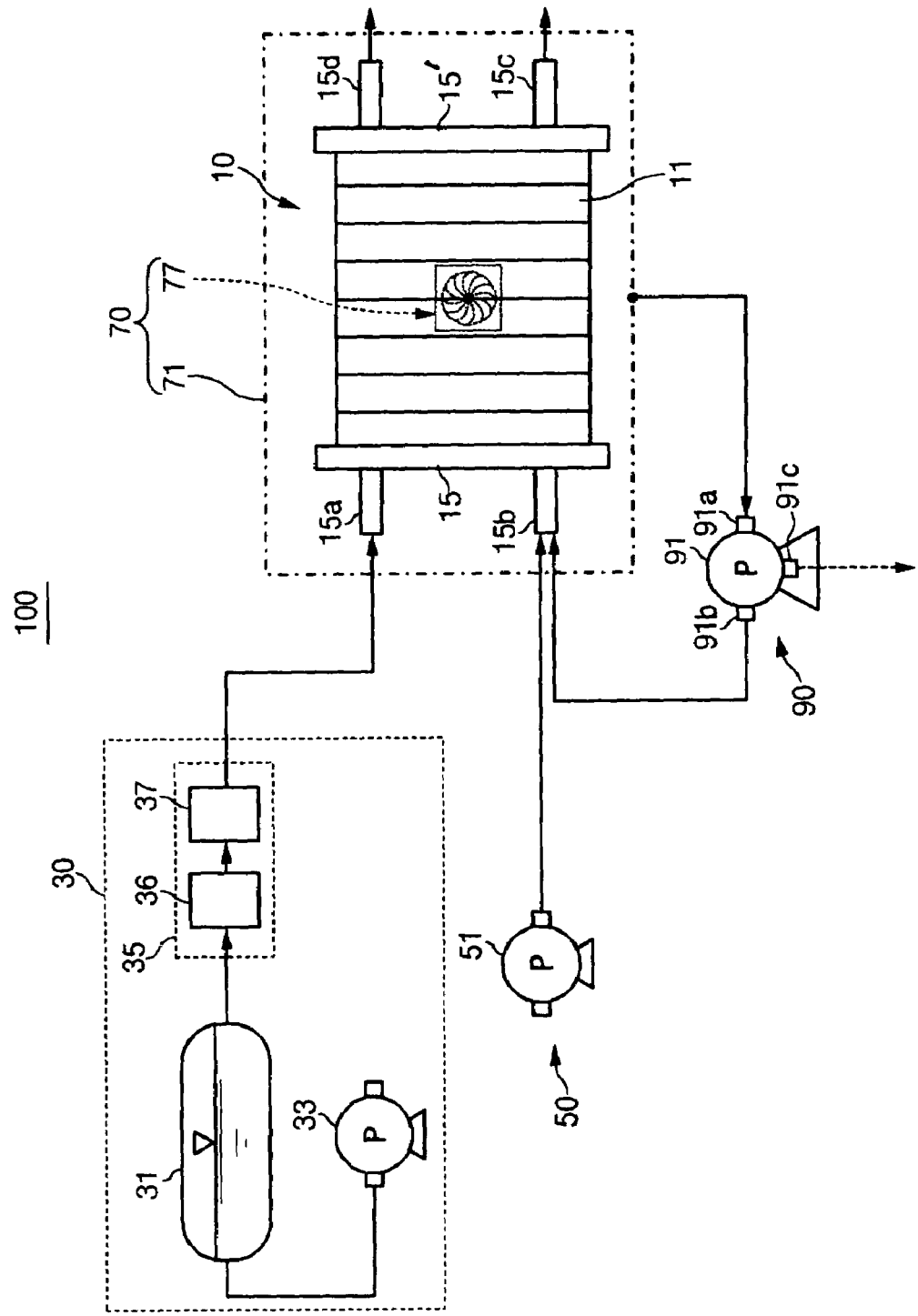
FIG. 1 is a simplified block diagram illustrating the structure of a fuel cell system according to an exemplary embodiment of the present invention.

Referring now to FIG. 1, fuel cell system 100 employs a PEMFC type system, in which hydrogen gas is generated by reforming fuel containing hydrogen. The hydrogen gas is then electro-chemically reacted with oxidation gas to generate electric energy. In addition, the system 100 may use the oxygen gas stored in a separate storage container or simply contained in the air as the oxidation gas reacting with the hydrogen gas. In the following, it will be assumed that the oxygen contained in the air is used.

The exemplary embodiment fuel cell system 100 according to the present invention includes at least an electricity generating unit 11 which generates electric energy through an electrochemical reaction between the oxygen and the hydrogen, a fuel supply source 30 which supplies the hydrogen gas to the electricity generating unit 11, a main oxygen supply source 50 which supplies the oxygen to the electricity generating unit 11 during an initial operation of the system 100, and a cooling apparatus 70 which provides the electricity generating unit 11 with a cooling medium to cool the heat generated in the electricity generating unit 11.

The electricity generating unit 11 receives the hydrogen from the fuel supply source 30, and the oxygen from the main oxygen supply source 50 and a subsidiary oxygen supply source 90, which will be described below, to generate electric energy through an electrochemical reaction between the oxygen and the hydrogen, thereby constituting a basic unit of the fuel cell.

The fuel cell system 100 according to the present invention includes a plurality of electricity generating units 11 connected in series to constitute a combination of the electricity generating units 11, called a stack 10.

The fuel supply source 30 includes a fuel tank 31 for storing the liquid fuel, a fuel pump 33 for discharging the fuel stored in the fuel tank 31 by a predetermined level of pumping force, a reformer 35 for receiving the fuel from the fuel tank 31 to generate hydrogen gas from the fuel and supplying the hydrogen gas to the electricity generating unit 11 in the stack 10.

In the fuel supply source 30, the reformer 35, called a "fuel processor" in the art, is connected to the fuel tank 31 and the stack 10. The reformer 35 includes a reformation reaction unit 36 which generates hydrogen gas from the fuel through a reformation catalytic reaction such as steam reformation, partial oxidation, natural thermal reaction, etc., and at least a carbon-monoxide removing unit 37 which reduces the concentration of carbon monoxide contained in the hydrogen gas by using a catalytic reaction such as a water-gas shift reaction, a preferential oxidation reaction, etc. or hydrogen purification with a separating membrane. The aforementioned reformer 35 may have a construction similar to a typical PEMFC type reformer, and thus their detailed description will not be given herein.

In addition, a main oxygen supply source 50, supplying oxygen to the electricity generating unit 11 in the stack 10 during an initial operation of the system 100, includes a first air pump 51 which sucks external air and outputs it to the electricity generating unit 11.

Alternatively, the fuel cell system 100 according to the present invention may employ a DMFC scheme, capable of generating electricity by directly supplying the fuel to the stack 10. The DMFC system does not need to have the reformer 35 but only have a fuel tank 31 and a fuel pump 33 in the fuel supply source 30 shown in FIG. 1, in comparison with the PEMFC system. However, hereinafter, descriptions will be given by exemplifying the PEMFC system 100.

Now, an exemplary stack according the present invention will be described in more detail.

Figure 2:
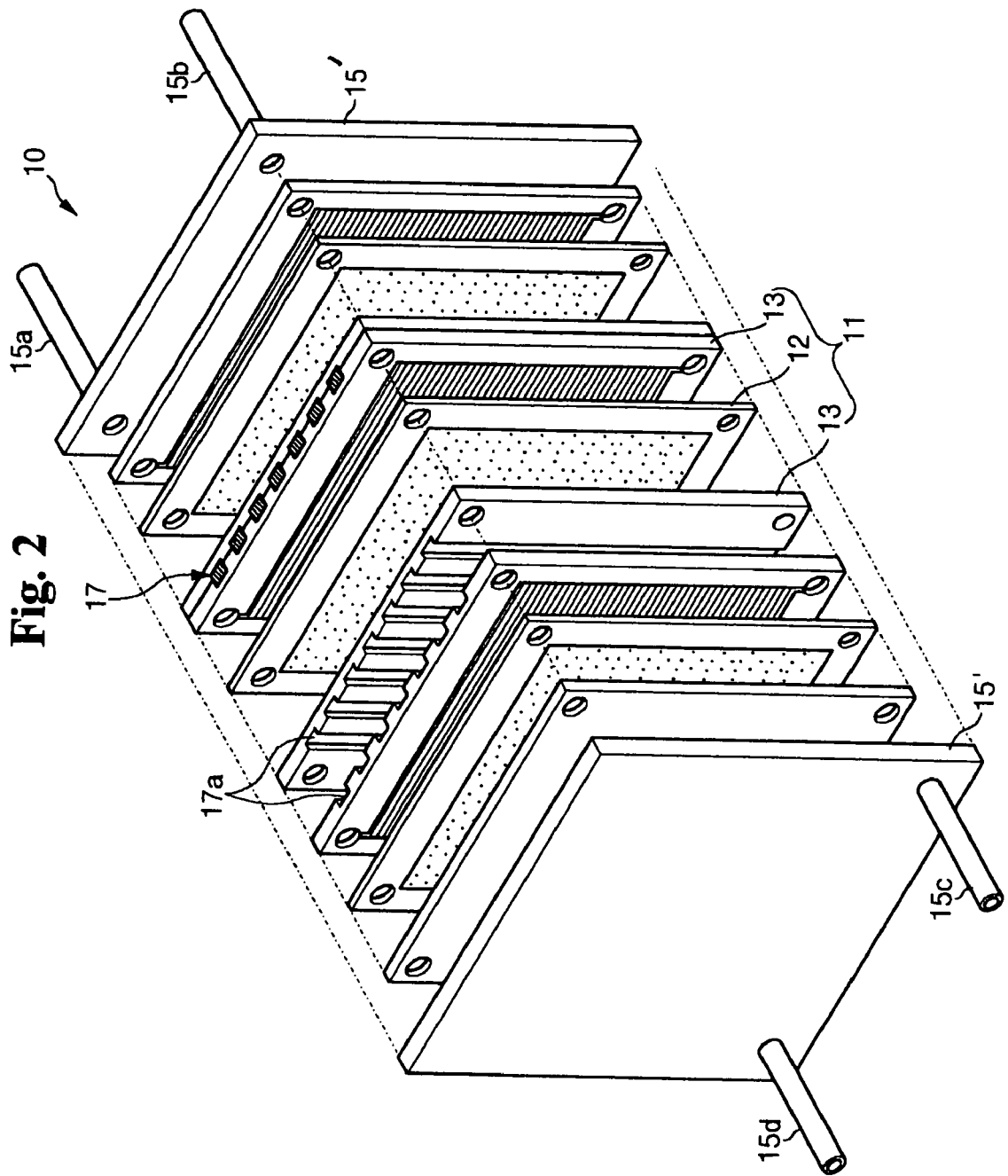
FIG. 2 is an exploded perspective view illustrating a structure of a stack in a fuel cell system of FIG. 1.
Figure 3:
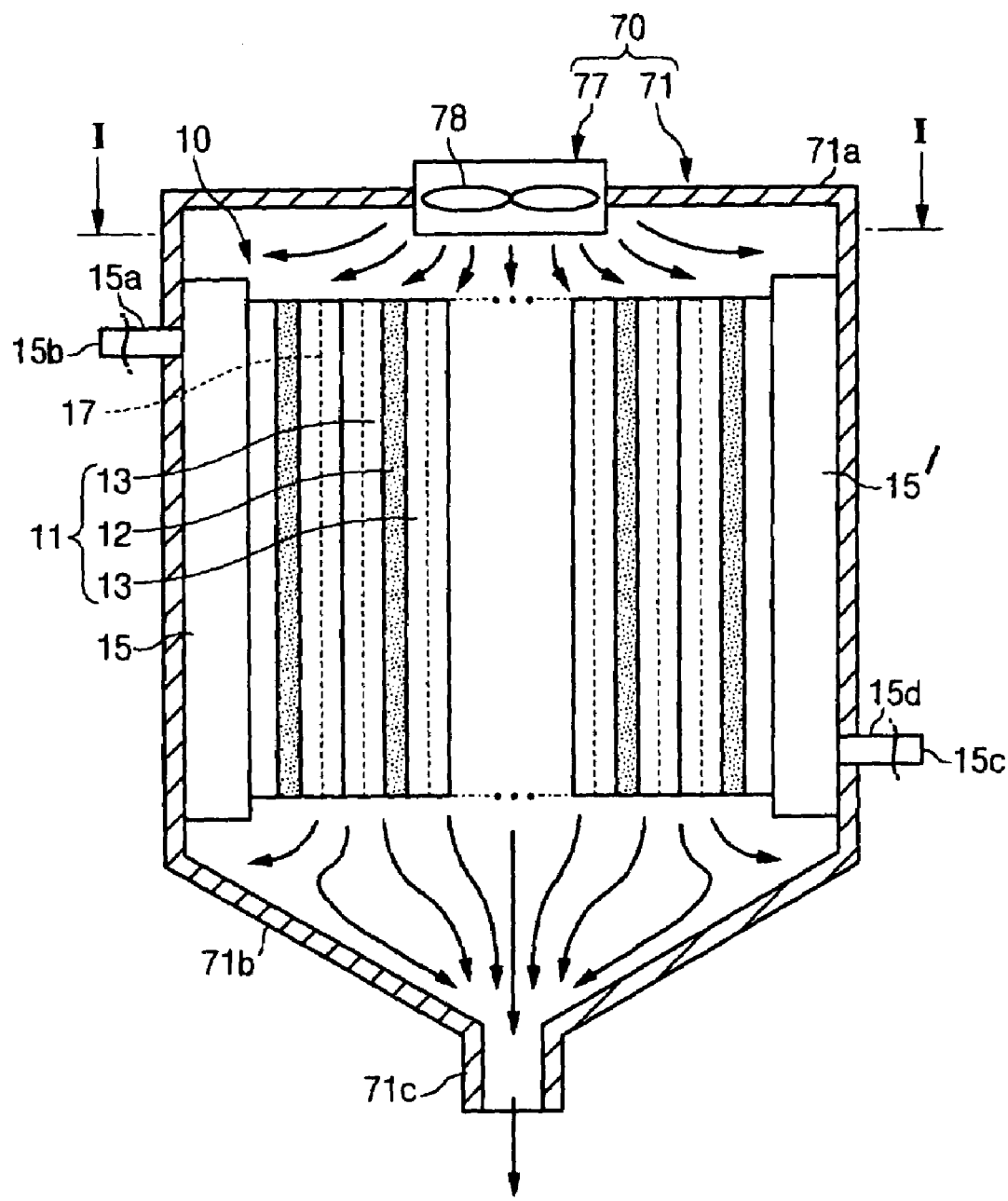
FIG. 3 is a cross-sectional view illustrating a structure of a cooling apparatus shown in FIG. 1.
Figure 4:
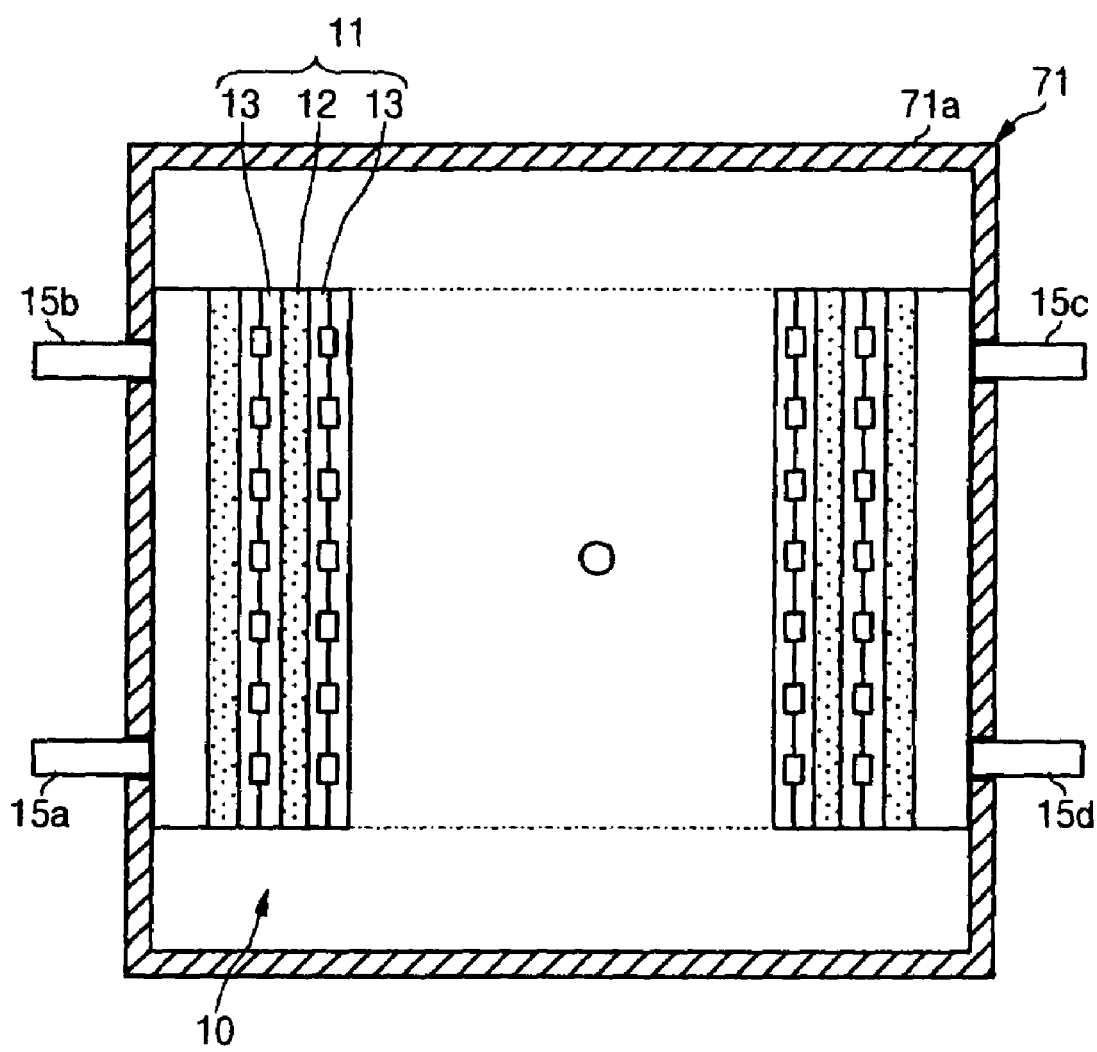
FIG. 4 is a sectional view taken along line I-I of FIG. 3.

FIG. 2 is an exploded perspective view illustrating a structure of a stack in a fuel cell system according to a first embodiment of the present invention, FIG. 3 is a cross-sectional view illustrating a structure of a cooling apparatus shown in FIG. 1, and FIG. 4 is a sectional view taken a line I-I of FIG. 3.

As mentioned above, the stack 10 of the present system 100 comprises a combination of the electricity generating units 11. Such an electricity generating unit 11 comprises an MEA 12 and separators 13 (also know as bipolar plates in the arts) provided on both sides thereof.

In the MEA 12, an anode electrode and a cathode electrode (not shown) are provided opposing one another with an electrolyte film interposed therebetween. In such a structure, the anode electrode oxidizes the hydrogen to convert it into hydrogen ions (i.e., protons) and electrons. In addition, the cathode electrode deoxidizes the electrons and the hydrogen ions moved from the anode electrode to generate water and heat having a predetermined level of temperature. Further, the electrolyte film performs an ion exchange function for moving the hydrogen ions generated in the anode electrode into the cathode electrode.

The separators 13 closely adhere to both sides of the MEA 12 interposed therebetween to supply the hydrogen gas generated in the reformer 35 to the anode electrode of the MEA 12, and supply the air to the cathode electrode of the MEA 12. In addition, the separators 13 function as a conduction body for connecting the anode electrode and the cathode electrode in series.

In the outermost side of the stack 10, input pressure plate 15 and output pressure plate 15' may be separately provided to give pressure on the electricity generating units 11. However, the stack according to the present invention may be constructed to exclude the input and output pressure plates 15, 15'. Instead, the outermost one of the separators in the electricity generating units 11 may function as a pressure plate. In addition to such a function, the stack may be configured to have a generic function of the separator 13 as described above.

Furthermore, the input pressure plate 15 includes a first inlet 15a for supplying the hydrogen gas to the electricity generating units 11 and a second inlet 15b for supplying the air to the electricity generating units 11. Output pressure plate 15' includes a first outlet 15c for exhausting the hydrogen gas remained in the electricity generating units 11 after reaction and a second outlet 15d for discharging moisture generated by the reaction between the hydrogen and the oxygen and air remained in the electricity generating units 11 after the reaction with the hydrogen. In this configuration, the first inlet 15a may be connected to the carbon monoxide removing unit 37 of the reformer 35, and the second inlet 15b may be connected to the main oxygen supply source 50 and the subsidiary oxygen supply source 90, which will be described below.

During the reaction in the fuel cell system 100 according to the present invention, the aforementioned de-oxidation reaction in the electricity generating units 11 generates heat. This heat dries the MEA 12, thereby causing performance decrease in the entire stack 10.

For this reason, the fuel cell system 100 is constructed to provide the entire stack 10 with a cooling medium (i.e., a cooling apparatus 70) for cooling the heat generated in the stack 10.

According to an embodiment of the present invention, the cooling apparatus 70 includes a housing 71 for receiving the entire stack 10 and a cooling medium supply unit 77 for supplying a cooling medium to the inside of the housing 71. According to one embodiment of the present invention, the cooling medium may be liquid cold water. In another embodiment, the cooling medium may be gaseous. Therefore, external air may be used as a cooling medium since it can be easily obtained from the natural world and has a lower level of temperature than the air inside the stack 10.

The housing 71 has a receiving space for installing the stack 10 and has such a structure that the air passing through the stack 10, i.e., the air heated to a higher temperature than the cooling air supplied from the cooling medium supply unit 77 by cooling the heat generated in the stack 10, is guided, collected, and then discharged to an external space.

More specifically, the housing 71 includes a body having the aforementioned receiving space, a guide section 71b extending to one side of the body 71a to guide the heated air, and an exhaust duct 71c extending to one side of the guide section 71b to discharge the heated air to the outside of the housing 71.

In this structure, the body 71a may be formed in a circular or rectangular column shape, and the guide section 71b may be formed in a funnel shape having a decreasing inner diameter toward the exhaust duct 71c. The cross-section of the funnel may be a polygonal shape such as a circular or rectangular shape.

In addition, in order to supply cooling air to the receiving space of the housing 71, the cooling medium supply unit 77 is provided in an upper portion of the housing 71. The cooling medium supply unit 77 includes at least a fan 78 which gets cool air from outside with a predetermined level of rotating force and exhausts the air into the receiving space of the housing 71. Alternatively, the cooling medium supply unit 77 may be provided with typical ventilation utilities such as a pump or a blower other than the fan.

In the aforementioned stack 10, a cooling pathway 17 is provided between the neighboring electricity generating units 11 in order to flow the cooling air supplied from the cooling medium supply unit 77.

The cooling pathway 17 may be formed by combining the opposite channels 17a when a separator 13 in one of the electricity generating units 11 is incorporated with another separator 13 in the neighboring one of the electricity generating units 11. In this case, the cooling pathway 17 may be formed in a vertically or horizontal direction according to the flowing direction of the cooling air with respect to the separator 13, but is not limited to this configuration. For example, the flowing direction of the cooling air may be zigzagged.

Referring to FIGS. 1, 3 and 4, the fuel cell system 100 according to the present invention includes a subsidiary oxygen supply unit 90 which collects the heated air having a relatively high temperature and supplies the heated air to the electricity generating unit 11 of the stack 10 in order to cool the heat generated in the stack 10 by using the aforementioned cooling apparatus 70 during a normal operation after an initial operation. The subsidiary oxygen supply source 90 provides the MEA 12 of the electricity generating unit 11 with the oxygen to be de-oxidized with the hydrogen ions.

Such a subsidiary oxygen supply source 90 includes a second air pump 91 which sucks the heated air exhausted from the exhaust duct 71c of the housing 71, and supplies the heated air to the electricity generating unit 11 of the stack 10.

The second air pump 91 also includes an inlet 91a connected to the exhaust duct 71c of the housing 71 to suck the heated air and a first outlet 91b connected to the second inlet 15b of the stack 10 to output the heated air to the second inlet 15b. In addition, the second air pump 91 includes a second outlet for adjusting the amount of the air supplied to the second inlet 15b of the stack 10 through the first outlet 91b. The second outlet 91c is configured to selectively output part of the air supplied through the inlet 91a to substantially adjust the amount of the air supplied to the stack 10 through the first outlet 91b.

Now, operation of the fuel cell system according to the present invention will be described in more detail.

First, during an initial operation of fuel cell system 100, the fuel pump 33 is operated to draw off the fuel stored in the fuel tank 31 and supply the fuel to the reformation reaction unit 36 of the reformer 35. Then, the reformation reaction unit 36 generates hydrogen gas from the fuel through a reformation catalytic reaction such as a steam reformation (SR) catalytic reaction. In this case, the reformation reaction unit 36 generates hydrogen gas having a small amount of carbon monoxide as a sub-product because it is very difficult to perfectly perform the reformation catalytic reaction.

Subsequently, the hydrogen gas is supplied to a carbon monoxide removing unit 37. The carbon monoxide removing unit 37 reduces the concentration of the carbon monoxide contained in the hydrogen gas through a water-gas shift (WGS) catalytic reaction or a preferential CO oxidation (PROX) catalytic reaction, and supplies the hydrogen gas to the first inlet 15a of the stack 10.

During such a procedure, the air is supplied to the second inlet 15b of the stack 10 by driving the first air pump 51.

As a result, the hydrogen gas and the air are supplied to the electricity generating unit 11 through the separator 13. In the electricity generating unit 11, electrochemical reaction between the hydrogen contained in the hydrogen gas and the oxygen contained in the air generates a predetermined level of output electric energy. In addition, a predetermined temperature of heat is generated through de-oxidation of the oxygen in the electricity generating unit 11. In this case, the heat is transferred to the separator 13 of the electricity generating unit 11.

Under such circumstances, the fan 78 is operated to supply a low temperature of cooling air to the inner space of the housing 71. Then, the cooling air passes through a cooling pathway 17 provided between neighboring electricity generating units 11 to cool the heat transferred to the separator 13. At this point, the cooling air is heated when it passes through the cooling pathway 17, guided by the guide section 71b of the housing 71, and then exhausted to outside of the housing 71 through the exhaust duct 71c.

During a normal operation mode after the initial operation, the fuel cell system 100 puts the second air pump 91 into operation to suck the heated air output from the exhaust duct 71c and supply the heated air to the second inlet 15b of the stack 10. In this case, the operation of the first air pump 51 is halted. Additionally, the electricity generating unit 11 of the stack 10 continuously receives the hydrogen gas through the first inlet 15a.

When the amount of the air supplied to the second inlet 15b through the first outlet 91b of the second air pump 91 exceeds the amount of the air corresponding to a predetermined level of output electric energy of the entire stack 10, the air is bypassed through the second outlet 91c of the second air pump 91, thereby adjusting the amount of the air.

As a result, the electricity generating unit 11 of the stack 10 receives the hydrogen gas and the air through the separator 13, and generates electric energy through electro-chemical reaction between the hydrogen contained in the hydrogen gas and the oxygen contained in the air.

Therefore, the fuel cell system 100 according to the present invention can supply a predetermined level of electric energy to particular loads including portable electronics such as a notebook and a PDA, and a mobile terminal by repeating a series of the aforementioned procedures during a normal operation after an initial operation.

Figure 5:
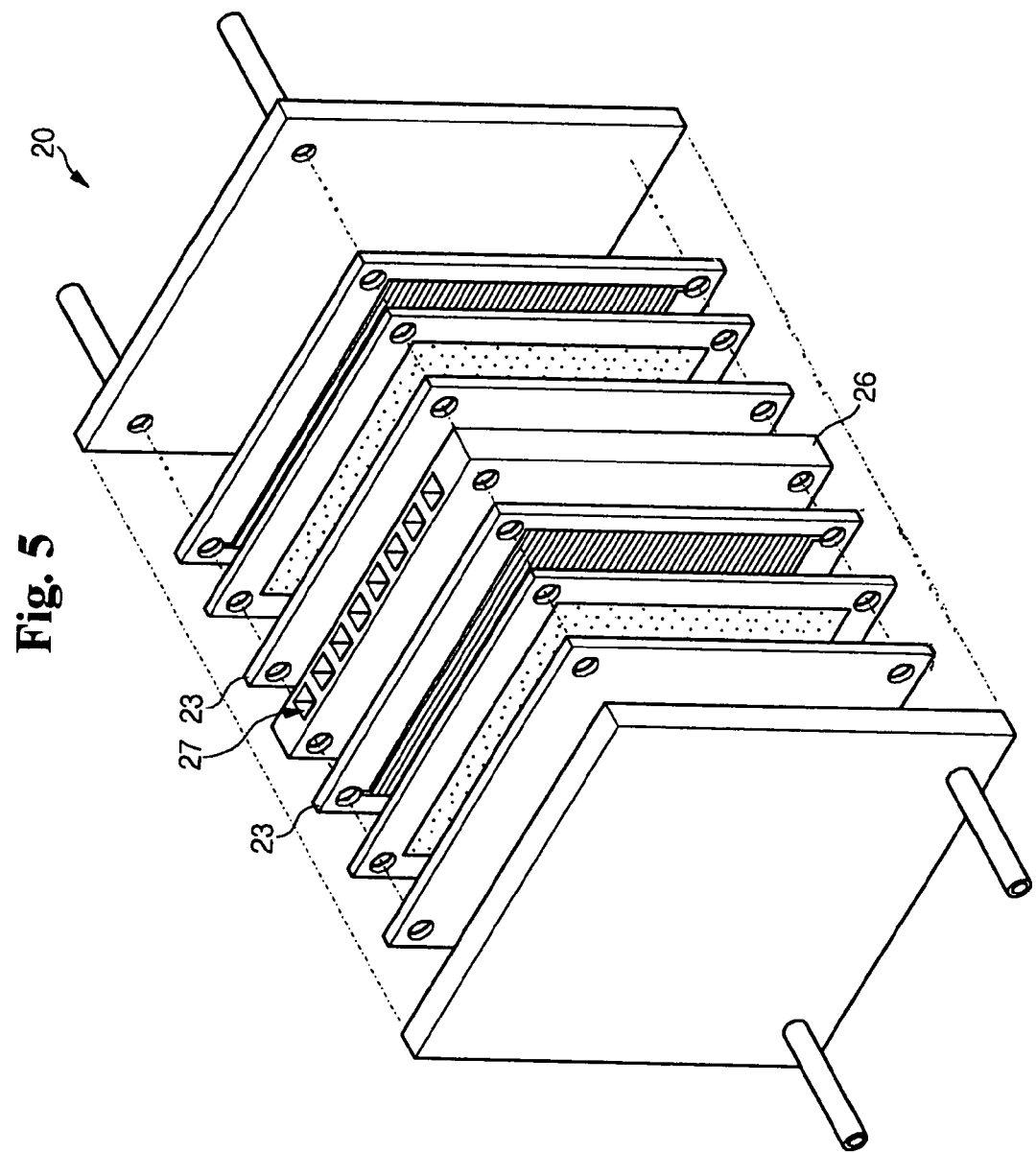
FIG. 5 is an exploded perspective view illustrating a structure of a stack in a fuel cell system according to a second embodiment of the present invention.
Figure 6:
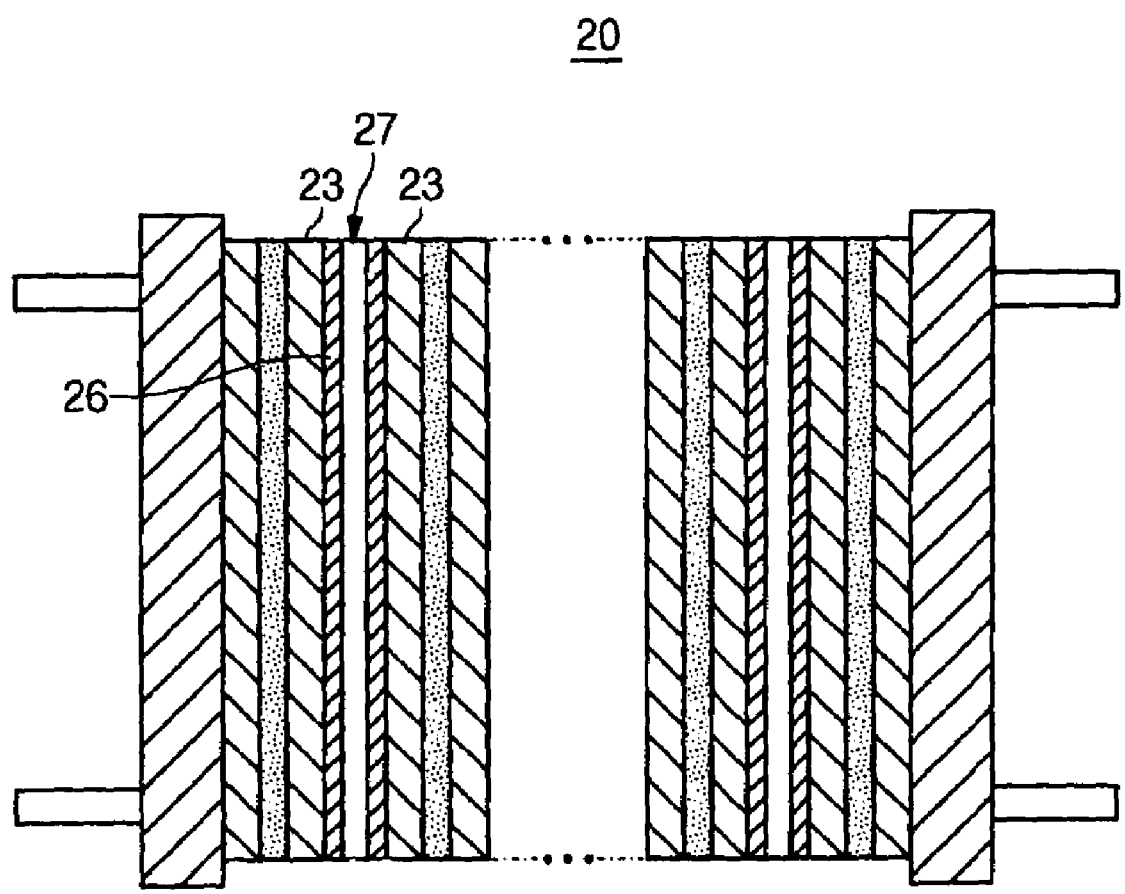
FIG. 6 is a cross-sectional view illustrating the stack of FIG. 5 when assembled.

FIG. 5 is an exploded perspective view illustrating a structure of a stack used in a fuel cell system according to a second embodiment of the present invention, and FIG. 6 is a cross-sectional view illustrating the stack of FIG. 5 when assembled.

Referring to FIGS. 5 and 6, the stack 20 according to the present invention is configured in such a way that a cooling plate 26 is provided in each space between the separators 23 of the neighboring electricity generating units 11, and a cooling pathway 27 is provided in the cooling plate 26 to ventilate the cooling air. The cooling plate 26 functions as a heat radiator which exhausts the heat transferred to the separator 23 when the electricity generating unit 11 generates electricity. In this case, the cooling plate 26 may be formed from a thermal conductive material such as Al, Cu, Fe, and an alloy of them. In addition, the cooling pathway 27 may be formed to pass through the cooling plate 26 from one side to the other side thereof in order to provide smooth ventilation of the cooling air for the entire stack 20.

Other components of the stack 20 according to the second embodiment are similar to those of the aforementioned first embodiment.

In a cooling apparatus according to the present invention and a fuel cell system employing the same, the stack is incorporated into the inner space of the housing, and the cooling air is supplied thereto, so that the heat generated in the stack can be cooled. Therefore, it is possible to equalize heat distribution over the entire stack and to maintain the operating temperature of the stack in an appropriate level. As a result, it is possible to guarantee safety of the stack, and also to improve performance efficiency of the entire stack.

In addition, according to the present invention, since the air heated during cooling the stack can be reused to supply the oxygen necessary to generate the electricity in the stack, it is possible to reduce the capacity of the pump supplying the air to the stack. Furthermore, there is no need to preheat the air to be supplied to the stack. Therefore, it is possible to reduce energy losses. Also, since the power consumed to drive the system can be reduced, it is possible to further improve performance efficiency and energy efficiency of the entire system.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:

1. A cooling apparatus for a fuel cell, comprising:
a housing for receiving an electricity generating unit; and
a cooling medium supply unit connected to the housing to supply a cooling medium to the electricity generating unit,
wherein the housing includes:
a body having a space for receiving the electricity generating unit;
a guide section connected to the body to collect the cooling medium passing through the electricity generating unit; and
an exhaust unit connected to the guide section to exhaust the cooling medium to outside of the housing,
wherein a plurality of electricity generating units are provided in the receiving space and the cooling medium flows along at least one cooling pathway interposed between the electricity generating units,
wherein the cooling medium supply unit, the at least one cooling pathway and the exhaust unit are substantially aligned in a same direction, and
wherein the guide section is in a funnel shape having a decreasing inner diameter toward the exhaust unit.

2. The cooling apparatus of claim 1, wherein the cooling medium supply unit includes a fan which sucks air and exhausts the air to the receiving space.

3. A fuel cell system comprising:
an electricity generating unit which generates electricity through reaction between oxygen and hydrogen, the stack having at least one cooling pathway for passing the cooling medium through neighboring electricity generating units;
a fuel supply source which supplies the hydrogen to the stack;
a main oxygen supply source which supplies the oxygen to the stack during an initial operation of the fuel cell system;
a cooling apparatus substantially in line with the stack and which supplies the cooling medium to the stack to cool the heat generated in the stack; and
a subsidiary oxygen supply source which collects the cooling medium heated by passing through the stack and supplies the cooling medium to the stack,
wherein the cooling apparatus comprises:
a housing having a receiving space for receiving the stack; and
a cooling medium supply unit connected to the housing for supplying the cooling medium to the receiving space,
wherein the housing comprises:
a body having the receiving space;
a guide section connected to the body for collecting the cooling medium passing through the stack, and
an exhaust unit connected to the guide section for exhausting the cooling medium to outside of the housing,
wherein the at least one cooling pathway and the exhaust unit are substantially aligned in a same direction, and
wherein the guide section is in a funnel shape having a decreasing inner diameter toward the exhaust unit.

4. The fuel cell system of claim 3, wherein
the electricity generating units each include separators and a membrane-electrode assembly interposed between the separators.

5. The fuel cell system of claim 3, wherein
the cooling pathway is formed in a space where one side of one of the separators is adjacent to one side of the opposing one of the separators.

6. The fuel cell system of claim 5, wherein
the cooling pathway is formed by combing channels on each surface of the adjacent sides of the separators.

7. The fuel cell system of claim 3, wherein
the cooling pathway is in a cooling plate disposed between the electricity generating units.

8. The fuel cell system of claim 3, wherein the cooling medium supply unit includes at least a fan which sucks air and exhausts the air to the receiving space.

9. The fuel cell system of claim 3, wherein the fuel supply source comprises:
a fuel tank for reserving the fuel; and
a pump connected to the fuel tank to supply the fuel.

10. The fuel cell system of claim 9, wherein the fuel supply source includes a reformer which receives the fuel from the fuel tank, generates hydrogen gas, and supplies the hydrogen gas to the electricity generating unit.

11. The fuel cell system of claim 3, wherein the main oxygen supply source includes an air pump for sucking air and supplying the air to the electricity generating unit.

12. The fuel cell system of claim 3, wherein the subsidiary oxygen supply source includes a pump connected to the exhaust unit of the housing to suck the cooling medium exhausted from the exhaust unit and supply the cooling medium to the electricity generating unit.

13. The fuel cell system of claim 12, wherein the pump includes an inlet for sucking the cooling medium and an outlet for outputting the cooling medium.

14. A cooling apparatus for a fuel cell having an electricity generating unit, the electricity generating unit having a cooling pathway, the cooling apparatus comprising:
a body including a receiving space for receiving the electricity generating unit;
a fan substantially in line with the receiving space for supplying a cooling medium to the receiving space and for guiding the cooling medium through the electricity generating unit;
a guide section connected to the body for collecting the cooling medium passing through the electricity generating unit;
an exhaust unit for exhausting the cooling medium out of the receiving space,
wherein the cooling pathway and the exhaust unit are substantially aligned in a same direction, and
wherein the guide section is formed in a funnel shape having a decreasing inner diameter toward the exhaust unit.

15. The cooling apparatus of claim 14, wherein the cooling medium includes air.

* * * * *

UNITED STATES PATENT AND TRADEMARK OFFICE
CERTIFICATE OF CORRECTION

| | | |
|---|---|---|
| PATENT NO. | : 7,485,384 B2 | Page 1 of 1 |
| APPLICATION NO. | : 11/043395 | |
| DATED | : February 3, 2009 | |
| INVENTOR(S) | : Seong-Jin An et al. | |

It is certified that error appears in the above-identified patent and that said Letters Patent is hereby corrected as shown below:

| | |
|---|---|
| Column 8, Claim 1, line 3 | Delete "to supply" Insert -- for supplying -- |
| Column 8, Claim 11, line 8 | Before "space" Insert -- receiving -- |
| Column 8, Claim 1, line 10 | Delete "to collect" Insert -- for collecting -- |
| Column 8, Claim 1, line 13 | Delete "to exhaust" Insert -- for exhausting -- |
| Column 8, Claim 1, line 20 | Delete "a nd" Insert -- and -- |
| Column 9, Claim 5, line 2 | Delete "formed" |
| Column 9, Claim 6, line 6 | Delete "combing" |
| Column 9, Claim 12, line 27 | Delete "to suck," Insert -- for sucking -- |
| Column 10, Claim 12, line 1 | Delete "supply" Insert -- for supplying -- |

Signed and Sealed this
Fifteenth Day of February, 2011

David J. Kappos
*Director of the United States Patent and Trademark Office*